(12) United States Patent
Geiser

(10) Patent No.: US 6,431,518 B1
(45) Date of Patent: Aug. 13, 2002

(54) VACUUM VALVE

(75) Inventor: Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 10 days.

(21) Appl. No.: 09/759,111

(22) Filed: Jan. 11, 2001

(51) Int. Cl.$^7$ .............................. F16K 3/18; F16K 25/00; F16K 31/143; F16K 31/363; F16K 31/383

(52) U.S. Cl. ...................... 251/62; 251/158; 251/159; 251/203; 251/250; 251/193

(58) Field of Search .................... 251/62, 158, 203, 251/204, 250, 157, 159, 193

(56) References Cited

U.S. PATENT DOCUMENTS

| | | |
|---|---|---|
| 3,185,435 A | 5/1965 | Hauser |
| 4,560,141 A | 12/1985 | Bosch |
| 5,415,376 A | 5/1995 | Ito |
| 5,641,149 A | 6/1997 | Ito |
| 5,755,255 A | 5/1998 | Iwabuchi |
| 5,934,646 A | 8/1999 | Tamura et al. |
| 6,045,117 A | 4/2000 | Tamura et al. |
| 6,056,266 A | 5/2000 | Blecha |
| 6,082,706 A | 7/2000 | Irie |
| 6,095,180 A | 8/2000 | Ishigaki et al. |

FOREIGN PATENT DOCUMENTS

| | | |
|---|---|---|
| DE | 32 24 387 | 5/1987 |
| DE | 196 33 798 | 2/1998 |
| EP | 1 028 278 | 8/2000 |

*Primary Examiner*—William C. Doerrler
*Assistant Examiner*—David A Bonderer
(74) *Attorney, Agent, or Firm*—Reed Smith LLP

(57) ABSTRACT

A vacuum valve comprises a valve opening which is provided in a valve housing and can be closed by a valve plate arranged at least one valve rod, at least a first piston-cylinder unit by which the valve plate is displaceable from its open position releasing the valve opening into a position which is located opposite the valve opening but is lifted from the valve seat, and at least a second piston-cylinder unit by which the valve plate can be moved toward the valve seat and pressed against it from its position which is located opposite the valve opening but is lifted from the valve seat. A first connection line runs between a base of the first piston-cylinder unit and a base of the second piston-cylinder unit, wherein a non-return valve is arranged in the first connection line and closes when there is a pressure in a closing cylinder space of the first piston-cylinder unit that is greater than or equal to the pressure in a closing cylinder space of the second piston-cylinder unit, and a mandrel is provided at the piston of the second piston-cylinder unit, which mandrel releases the non-return valve when the valve plate is in the position in which it is completely lifted from the valve seat.

15 Claims, 3 Drawing Sheets

VACUUM VALVE

BACKGROUND OF THE INVENTION a) Field of the Invention

The invention is directed to a vacuum valve with a valve plate which is arranged at a valve rod and by means of which a valve opening in a valve housing can be closed. The vacuum valve has an actuation device by means of which the valve plate is movable from its open position initially into a position which is located opposite the valve opening, but which is lifted from the valve seat, and can then be pressed against the valve seat surrounding the valve opening. The actuation device comprises first and second piston-cylinder units.

b) Description of the Related Art

Vacuum valves of the plate valve type in which the valve opening is closed by a valve plate which is pressed against the valve seat surrounding the valve opening are known in many different embodiment forms.

A first common embodiment form of plate valves of the type mentioned above are slide valves. In order to close the valve, the valve plate is initially displaced linearly by an actuation device in a direction transverse to the sealing surface until it is in a position which is located opposite to the valve opening, but is lifted from the valve seat. Subsequently, a movement is carried out vertical to the sealing surface and in the direction of the longitudinal axis of the valve opening, so that the valve plate is pressed against the valve seat. This two-step movement process is required so that the seal which is made of an elastic material, e.g., Viton, is not exposed to shearing stress, which would lead to unacceptable wear. The second step of the closing movement is achieved in different ways in slide valves of the type mentioned above, for example, by means of lever mechanisms, rolling bodies which are guided in wedge-shaped gaps between the valve plate and a supporting plate, tilting elements, and so on. In order to prevent bending of the valve rod during the second movement step (movement vertical to the sealing surface or valve opening), a counterplate is usually provided which is moved simultaneously against a wall located opposite the valve seat. Slide valves of this type are known, for example, from U.S. Pat. No. 4,560,141 A, DE 32 09 217 C2, DE 32 24 387 C2 and U.S. Pat. No. 3,185,435 A.

In a special type of plate valve or slide valve, the second movement step, that is, the movement of the valve plate against the valve seat by a movement directed essentially vertical to the sealing surface, is carried out in that the valve rod is swiveled about a fulcrum. This fulcrum can be formed by pins or rollers which are arranged laterally at the valve rod and guided in guide grooves. Accordingly, the valve rod is constructed in this instance in the manner of a lever which is initially displaced linearly and is then tilted. Examples of valve constructions of this type are shown in U.S. Pat. No. 5,415,376 A, U.S. Pat. No. 5,641,149 A, U.S. Pat. No. 6,045,117 A, U.S. Pat. No. 5,934,646 A, U.S. Pat. No. 5,755,255 A, U.S. Pat. No. 6,082,706 A and U.S. Pat. No. 6,095,180 A. Another valve device of this type is known from DE 19 63 37 98 A1. In the latter reference, the first and second movement steps for closing the valve are carried out by means of separate piston-cylinder units.

Another vacuum valve with separate piston-cylinder units for carrying out the two movement steps is known from U.S. Pat. No. 6,056,266 A.

In another type of plate valve, there is no linear displacement of the valve plate in the first step of the valve plate movement; rather, the valve plate is swiveled along an arc in order to move the valve plate into the position located opposite the valve opening. For this purpose, the valve rod is suspended by its end opposite the valve plate at a shaft so as to be swivelable about an axis extending vertical to the valve face. The second step of the closing movement of the valve plate in the direction of the valve seat is carried out by a linear displacement of this shaft.

When separate piston-cylinder units are used for carrying out the first and second movement steps of the closing movement, it must be ensured that they are actuated in the correct sequence when closing the valve as well as when opening the valve in order to prevent damage to the valve. Sequence control devices for controlling pneumatic consumers in correct sequence are known. However, they are usually relatively complicated.

OBJECT AND SUMMARY OF THE INVENTION

A primary object of the present invention is to provide a vacuum valve of the type mentioned above which is constructed in a simple manner and operates reliably.

According to the invention, this object is met by a vacuum valve comprising a valve opening which is provided in a valve housing, has an axis oriented in the through-flow direction of the valve and is surrounded by a valve seat, a valve plate which is arranged at at least one valve rod and by means of which the valve opening can be closed in the closed state of the valve, at least a first piston-cylinder unit by means of which the valve plate is displaceable from its open position releasing the valve opening into a position which is located opposite the valve opening but is lifted from the valve seat, at least a second piston-cylinder unit by means of which the valve plate can be moved toward the valve seat and pressed against it from its position which is located opposite the valve opening but is lifted from the valve seat, wherein the first piston-cylinder unit has a closing cylinder space, wherein a force acting upon the valve plate in the direction of its position located opposite the valve opening is generated when the closing cylinder space is acted upon by pressure, the second piston-cylinder unit has a closing cylinder space, wherein a force acting upon the valve plate in the direction of its position in which it is pressed against the valve seat is generated when the closing cylinder space is acted upon by pressure, the closing cylinder space of the first piston-cylinder unit has a base, wherein the piston of the first piston-cylinder unit is located adjacent to this base in the position of the valve plate which completely releases the valve opening, the closing cylinder space of the second piston-cylinder unit has a base, wherein the piston of the second piston-cylinder unit is located adjacent to this base in the position of the valve plate in which the latter is completely lifted from the valve seat, a first connection line runs between said base of the first piston-cylinder unit and said base of the second piston-cylinder unit, wherein a check valve or non-return valve is arranged in the first connection line and closes when there is a pressure in the closing cylinder space of the first piston-cylinder unit that is greater than or equal to the pressure in the closing cylinder space of the second piston-cylinder unit, and a pin or mandrel is provided at the piston of the second piston-cylinder unit, which mandrel releases the non-return valve when the valve plate is in the position in which it is completely lifted from the valve seat.

In this way, the movement steps are carried out in correct sequence when the vacuum valve is opened as will be explained in more detail in the description of the drawings with reference to an embodiment example.

In a preferred embodiment example of the invention, a recess is provided in the base of the second piston-cylinder unit, wherein a projection of the piston of the second piston-cylinder unit can be inserted into this recess in the position of the valve plate in which it is completely lifted from the valve seat, wherein a first control line opens into this recess, namely, in the area below the inserted projection which forms a piston surface. Further, the opening cylinder space of the first piston-cylinder unit (wherein a force acting upon the valve plate in the direction of its position which completely releases the valve opening is generated when this opening cylinder space is acted upon by pressure) and the opening cylinder space of the second piston-cylinder unit (wherein a force acting upon the valve plate in the direction of its position in which it is completely lifted from the valve seat is generated when this opening cylinder space is acted upon by pressure) are connected with one another by a second connection line into which a second control line opens. By means of this step, a very simply constructed sequence control arrangement can also be realized for the closing movement of the valve as will be explained in more detail in the description of the drawings with reference to an embodiment example.

The various features and constructions according to the invention are reproduced in the claims.

Further advantages and details of the invention are explained in the following with reference to the embodiment example shown in the drawing, further objects of the invention also following therefrom.

DESCRIPTION OF THE PREFERRED EMBODIMENTS

Figure 1:
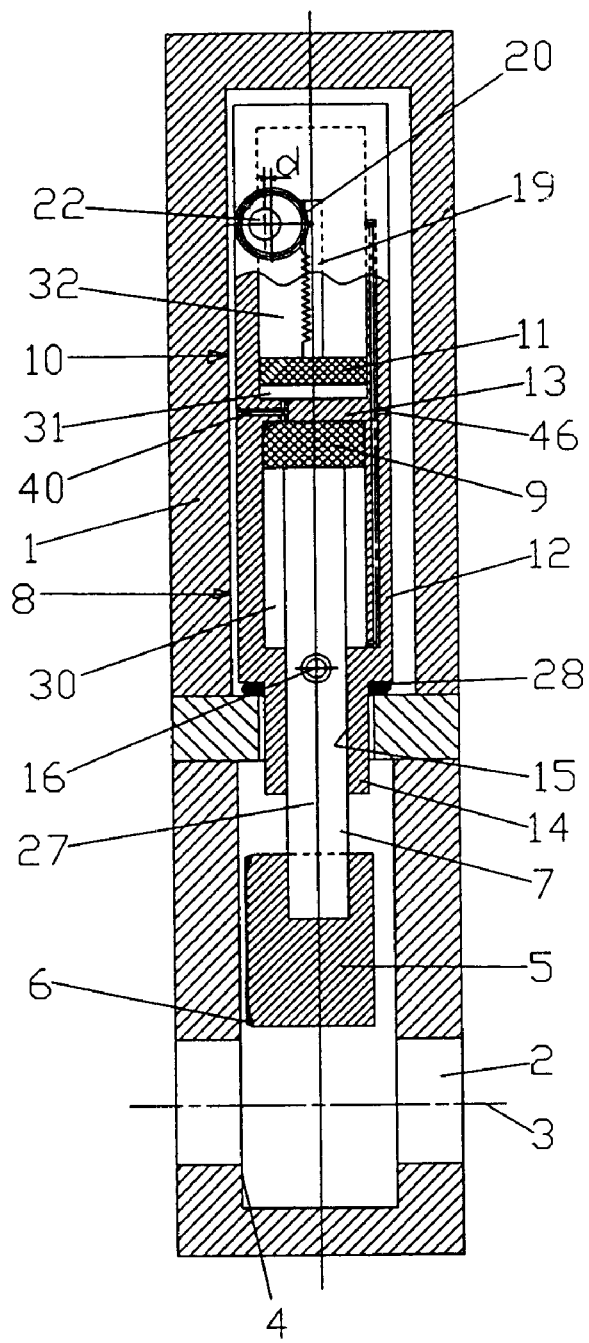
FIGS. 1 to 3 show schematic views of a section along line AA of FIG. 4 of a vacuum valve in the open, partially open and closed states.

The vacuum valve comprises a valve housing 1 in which is provided a valve opening 2 having an axis 3 oriented in the through-flow direction of the valve. The valve opening is surrounded by a valve seat 4 against which a valve plate 5 is pressed in the closed state of the valve. To seal the valve, a circumferentially closed seal 6 (made of Viton, for example) is secured to the valve plate 5 and is pressed against a sealing surface of the valve seat in the closed state of the valve. The seal 6 could also be arranged at the valve seat 4 and the sealing surface could be arranged at the valve plate 5.

The valve plate 5 is secured to valve rods 7 which are displaceable axially via first piston-cylinder units 8. For this purpose, the valve rods 7 are fixed to pistons 9 of these piston-cylinder units 8, i.e., they simultaneously form piston rods of these pistons 9. In the embodiment example shown here, the valve plate 5 is held by two valve rods 7, each of which can be actuated by a piston-cylinder unit 8. In other embodiment examples of vacuum valves of this kind, only one valve rod or more than two such valve rods may be provided depending on the size of the valve plate 5.

Second piston-cylinder units 10 having pistons 11 are rigidly connected with the first piston-cylinder units 8. The cylinders of the first and second piston-cylinder units are formed by a common housing 12 which has an intermediate wall 13 forming the two cylinders.

The respective piston rod 7 is guided in axial direction by a guide surface 15 which is formed by the inner jacket or inner surface of a sleeve-shaped projection 14 of the first piston-cylinder unit 8 extending in the direction of the valve plate 5. One or more sealing rings (not shown in the Figures) are arranged in a known manner between this inner surface of the projection 14 and circumferential surface 7 of the piston rod to form a linear lead-through of the valve rod 7. The housing 12 is mounted so as to be swivelable about a swiveling axis 16. This swiveling axis 16 extends vertical to the valve rod 7 and to the axis 3 of the vacuum valve. It is formed by cylindrical projections 17 which protrude at both sides of the housing 12 and which project into corresponding recesses 18 in the valve housing 1.

The respective housing 12 is swiveled about the swiveling axis 16 by means of the associated second piston-cylinder unit 10. For this purpose, in the shown embodiment example, a toothed rack 19 is secured to the piston 11 as a piston rod. This toothed rack 19 meshes with the pinion 20 of a drum 21. Cylindrical pins 22 are fixed laterally to the drum 21, namely, eccentrically with respect to the longitudinal axis 23 of the drum 21. The axis of the pins 22 is accordingly offset relative to the longitudinal axis 23 by a distance d (see FIG. 1). Rollers 24 are mounted on the pin 22 so as to be rotatable. These rollers 24 are guided in recesses 25 in a wall 26 of the valve housing 1. The rollers 24 are mounted so as to be approximately free from play in the recesses 25 in direction of the axis 3 of the valve opening, but are mounted with play in direction of the longitudinal axis 27 of the valve rods, which corresponds roughly to the distance d between the longitudinal axis 23 of the drum 21 and the axis of the pins 22.

Figure 2:
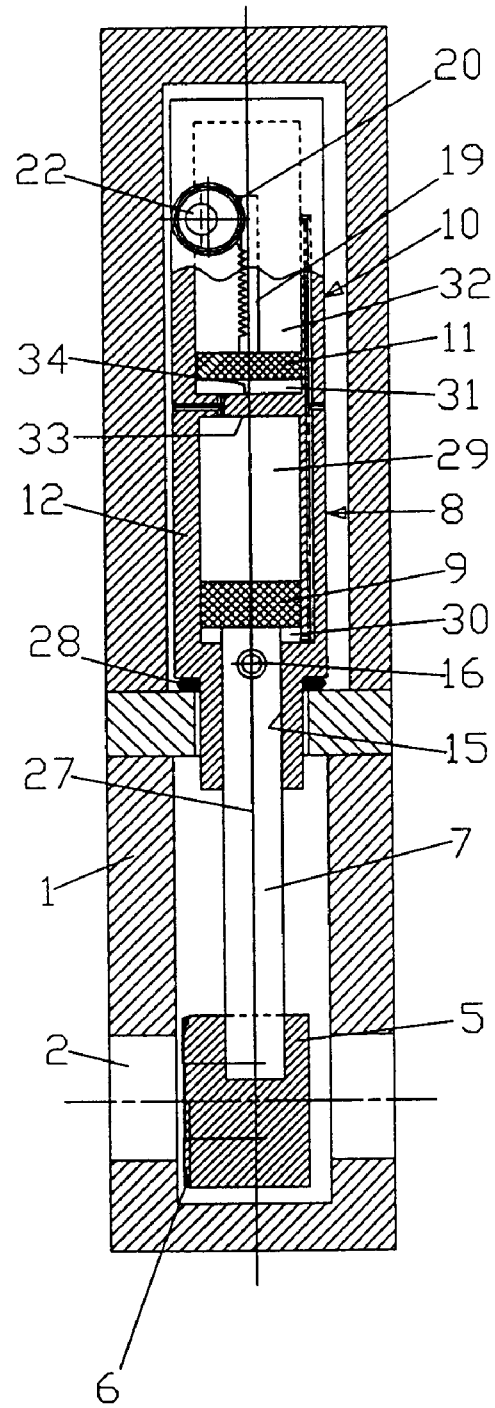
Figure 3:
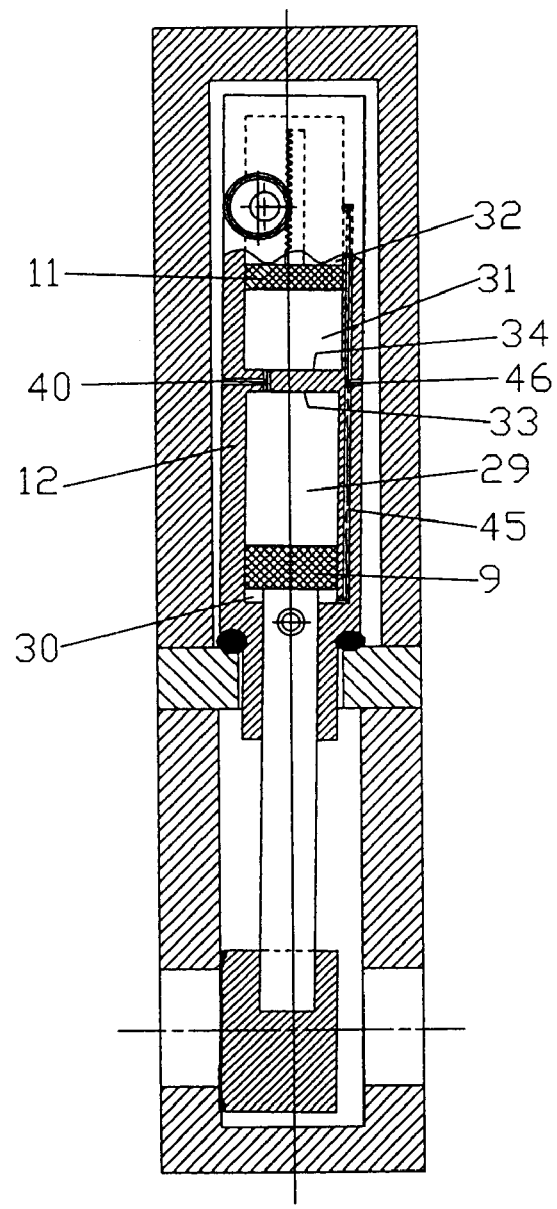

When closing the vacuum valve proceeding from the completely open position shown in FIG. 1, the pistons 9 of the first piston-cylinder units 8 are initially actuated so that the valve plate 5 is displaced into the position shown in FIG. 2 in which it is located opposite the valve opening 2 but is not yet pressed to the valve seat 4. The pistons 11 of the second piston-cylinder units 10 are subsequently actuated, so that the respective drum 21 is rotated by a total of 180° by the toothed rack 19. Due to the eccentric pins 22 arranged in the recesses 25, the housing 12 is tilted about the swiveling axes 16 and the valve plate 5 is pressed against the valve seat as is shown in FIG. 3.

For sealing between the housing 12 of the piston-cylinder units 8 and 10 and the valve housing 1, an O-ring 28 is provided which is located between sealing surfaces of the housing 12 and valve housing 1 that face one another and is pressed in axial direction. The O-ring 28 lies in a plane passing at right angles to the longitudinal axis 27 of the valve rod which is not tilted (in the position corresponding to FIGS. 1 and 2), and the O-ring 28 is located at the height of the swiveling axis 16, wherein the swiveling axis 16 preferably extends centrally through the material of the O-ring 28. In the tilted position of the valve rod corresponding to FIG. 3, the side of the O-ring located on the right in FIG. 3 (the side remote of the valve opening 2) is pressed more firmly than in the position in which the valve rod is not tilted, while the side located on the left in FIG. 3 is pressed less firmly. A tilting lead-through of very simple construction is provided in this way. This tilting lead-through could also be constructed differently in principle, for example, by means of a diaphragm bellows or folding bellows secured in a gastight manner to the projection 14 on one side and to the valve plate 5 on the other side.

Another actuating mechanism could also be provided for tilting the valve rods 7. For example, the piston rod which is secured to the piston 11 could be guided in a link guide which causes the tilting when the piston 11 is actuated. Further, the longitudinal axis of the piston-cylinder unit 10 could also be oriented parallel to the axis 3 of the valve opening 2, wherein the piston rod arranged at the piston 11 acts at a wall of the valve housing 1 and accordingly causes the tilting of the housing 12 when the piston 11 is actuated.

The sequence control arrangement for actuation of the pistons 9 and 11 in correct sequence is described in the following:

The piston-cylinder units 8 and 10 have opening cylinder spaces and closing cylinder spaces. When the closing cylinder space 29 of the first piston-cylinder unit 8 is acted upon by pressure, a force is generated which acts upon the valve plate in the direction of its position opposite the valve opening 2. An opposing force is generated when the opening cylinder space is acted upon by pressure. Likewise, a force acting upon the valve plate 5 in the direction of its position in which it is pressed against the valve seat (see FIG. 3) is generated when the closing cylinder space 31 of the second piston-cylinder unit 10 is acted upon by pressure. An opposing force is generated when the opening cylinder space 32 of the second piston-cylinder unit 10 is acted upon by pressure.

Figure 5:
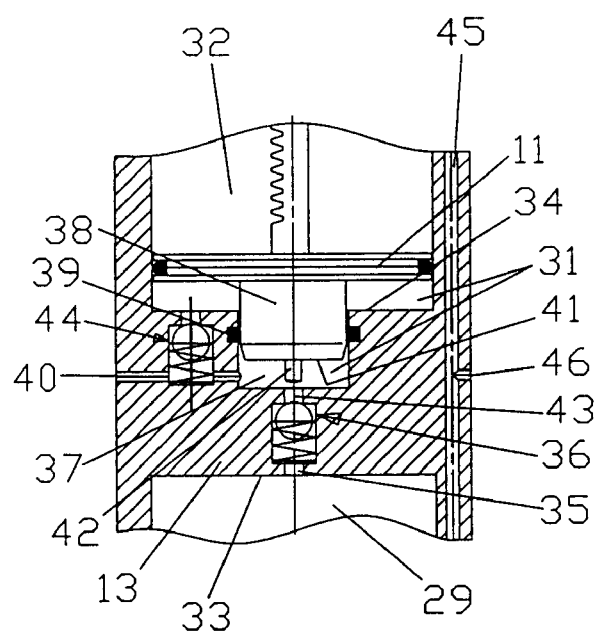
FIG. 5 shows a detailed view of a section of the vacuum valve in a section corresponding to FIGS. 1 to 3.
Figure 4:
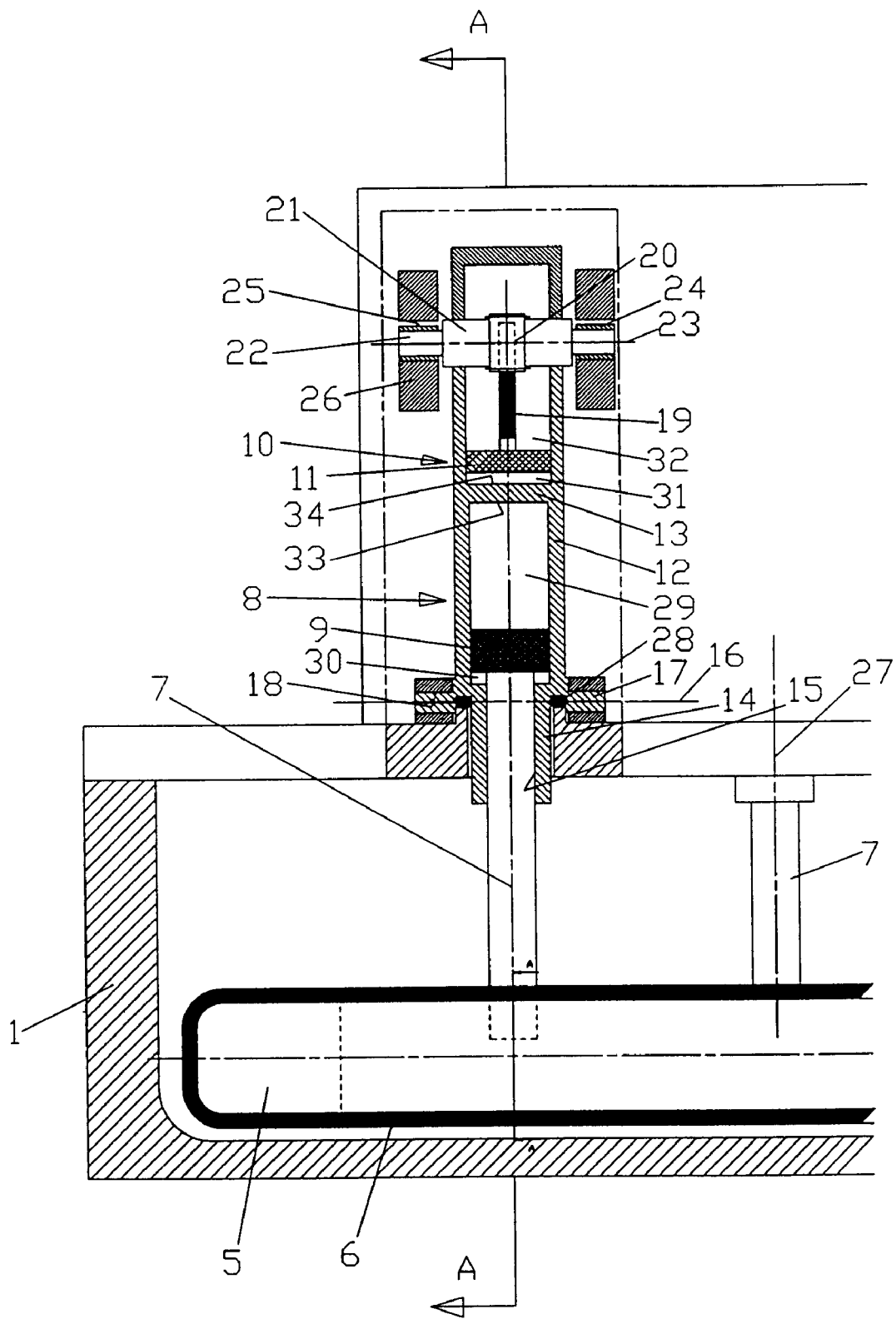
FIG. 4 shows a partial view of this vacuum valve, partially in section (the section line extends in the region of the valve plate between the housing wall having the valve opening and the valve plate)

The closing cylinder space 29 of the first piston-cylinder unit 8 has a base 33, wherein the piston 9 of the first piston-cylinder unit 8 is located adjacent to this base 33 in the position of the valve plate (see FIG. 1) in which the valve opening is completely released. The closing cylinder space 31 of the second piston-cylinder unit 10 has a base 34, wherein the piston 11 of the second piston-cylinder unit 10 is located adjacent to this base 34 in the position of the valve plate 5 (see FIG. 1 and FIG. 2) in which the latter is completely lifted from the valve seat 4. As will be seen from FIG. 5, which shows details of the sequence control arrangement (not shown in FIGS. 1 to 4 for the sake of clarity), a connection line 35 runs between the base 33 of the first piston-cylinder unit 8 and the base 34 of the second piston-cylinder unit 10, wherein a non-return valve 36 is arranged in the connection line 35. This non-return valve 36 closes when there is a pressure in the closing cylinder space 29 of the first piston-cylinder unit 8 that is greater than or equal to the pressure in the closing cylinder space 31 of the second piston-cylinder unit 10.

A recess 37 is formed in the base 34 of the second piston-cylinder unit 10, wherein a projection 38 of the piston 11 projects into this recess 37 when the piston 11 is adjacent to the base 34, i.e., in the position of the valve plate 5 which is completely lifted from the valve seat 4. An O-ring 39 which is arranged at the inner surface of the recess 37 and surrounds the latter annularly is provided for sealing the projection 38 inserted into the recess 37. A first control line 40 opens into this recess 37, specifically in the region below the projection 38 which is inserted into the recess. The end face of this projection forms a piston surface 41. A mandrel 42 is arranged at the piston 11, namely, at its projection 38, and projects into an opening 43 at the base of the recess 37 and accordingly releases the non-return valve 36 when the piston 11 is fully displaced toward the base 34, that is, in the position of the valve plate which is completely lifted from the valve seat.

Further, a non-return valve arrangement 44 is provided between the closing cylinder space 31 of the second piston-cylinder unit 10 and the recess 37. In the embodiment example shown in FIG. 5, this non-return valve arrangement is formed by a connection line between the closing cylinder space 31 and recess 37 and a non-return valve arranged in this connection line. This non-return valve closes when there is a pressure in the recess 37 that is greater than or equal to the pressure in the rest of the closing cylinder space 31. When the pressure in the rest of the closing cylinder space 31 is slightly higher compared with the recess 37, this non-return valve opens.

A second connection line 45 into which a second control line 46 opens is provided between the opening cylinder space 30 of the first piston-cylinder unit 8 and the opening cylinder space 32 of the second piston-cylinder unit 10.

When the vacuum valve is to be moved from the completely closed position corresponding to FIG. 3 into the completely open position corresponding to FIG. 1, the second control line 46 is acted upon by compressed air and the first control line 40 is deaerated, i.e., connected to atmospheric pressure. Compressed air can flow out of the closing cylinder space 31 of the second piston-cylinder unit via this control line 40, so that the piston 11 moves downward proceeding from its position shown in FIG. 3. On the other hand, the closing cylinder space 29 of the first piston-cylinder unit 8 is initially closed by the non-return valve 36, so that the piston 9 does not yet move. The piston surface of the piston 9 facing the cylinder space 30 is only about half the size of the piston surface facing cylinder space 29. When the projection 38 of the piston 11 penetrates into the recess 37, the air remaining in the rest of the closing cylinder space 31 can flow out through the non-return valve arrangement 44 into the control line 40. As soon as the valve plate 5 has reached the position located opposite the opening 2 (compare FIG. 2), the mandrel 42 releases the non-return valve 36, so that the closing cylinder space 29 of the first piston-cylinder unit 8 is deaerated and the piston 9 now moves upward until it has reached the completely open position of the valve shown in FIG. 1.

In order to close the valve, the first control line 40 is acted upon by compressed air and the second control line 46 is deaerated, i.e., connected with the atmosphere. When the first control line 40 is acted upon by compressed air, compressed air is pressed into the closing cylinder space 29 of the first piston-cylinder unit 8, so that the piston 9 is pressed downward. The air which is accordingly pressed out of the opening cylinder space 30 of the first piston-cylinder unit 8 leads to a back-pressure in the second connection line 45 (which runs between the opening cylinder space 30 and the opening cylinder space 32) because of the limited cross section of the second control line 46. This back-pressure also exists in the opening cylinder space 32 of the second piston-cylinder unit 10 and acts upon the piston 11 with a force acting in the opening direction. The pressure present at the control line 40 initially acts only on the piston surface 41 of piston 11. Since this piston surface 41 is substantially smaller than the piston surface of the piston 11 facing the opening cylinder space 32, this piston 11 does not move at first.

The back-pressure in the second connection line 45 and accordingly in the opening cylinder space 32 of the second piston-cylinder unit 10 does not subside until the piston 9 has reached its lower end position (corresponding to FIG. 1). The pressure acting on the piston surface 41 can accordingly move the piston 11 upward somewhat until the projection 38 moves out of the recess 37. The entire surface of the piston 11 facing the closing cylinder space 31 is now effective and the piston 11 is acted upon by the full closing force and moves upward until it has reached the end position shown in FIG. 3. It is advantageous that only a small force needs to be applied by the piston 11 during the first part of the movement of the piston 11 when the projection 38 is located in the recess 37, since the eccentric formed by the drum 21 and the pin 22 is located at the top dead center in this phase.

The non-return valve arrangement 44 shown above could also be constructed in the following manner:

The O-ring 39 can be given a non-return valve function, so that a separate line between the closing cylinder space 31 and the recess 37, including a non-return valve arranged therein, can be dispensed with. O-rings of this type with a non-return valve function are often used for end position damping of pistons. A commonly known O-ring of this type with a non-return valve function could also be used in this case; however, the installation direction is exactly the reverse of that in the conventional application for end-position damping, i.e., the O-ring seals when the pressure in the recess 37 is greater than that in the closing cylinder space 31. Through the use of an O-ring of this type with a non-return valve function, the quantity of parts required for sequence control can be minimized.

The valve can be modified in various ways without departing from the scope of the invention. For example, it is not important for the invention whether or not a housing surrounding the valve plate is provided as is shown in the Figures.

The sequence control described above can also be used for other arrangements of the first and second piston-cylinder units, for example, even when the latter are spatially separated and are not rigidly connected with one another. Of course, the first connection line 35 would then have to be constructed correspondingly longer.

The field of the invention is not limited to the embodiment example shown herein, but should be understood in relation to the attached claims together with the full range of possible equivalents.

While the foregoing description and drawings represent the present invention, it will be obvious to those skilled in the art that various changes may be made therein without departing from the true spirit and scope of the present invention.

Reference List 1 valve housing
2 valve opening
3 axis
4 valve seat
5 valve plate
6 seal
7 valve rod
8 first piston-cylinder unit
9 piston
10 second piston-cylinder unit
11 piston
12 housing
13 intermediate wall
14 projection
15 guide surface
16 swiveling axis
17 projection
18 recess
19 toothed rack
20 pinion
21 drum
22 pin
23 longitudinal axis
24 roller
25 recess
26 wall
27 longitudinal axis
28 O-ring
29 closing cylinder space
30 opening cylinder space
31 closing cylinder space
32 opening cylinder space
33 base
34 base
35 first connection line
36 non-return valve
37 recess
38 projection
39 O-ring
40 first control line
41 piston surface
42 mandrel
43 opening
44 non-return valve arrangement
45 second connection line
46 second control line

What is claimed is:

1. A vacuum valve comprising:
a valve housing having a valve opening, said valve opening having an axis oriented in the through-flow direction of the valve and is surrounded by a valve seat,
a valve plate which is arranged at at least one valve rod and by which the valve opening can be closed in the closed state of the valve;
at least a first piston-cylinder unit by which the valve plate is displaceable from its open position releasing the valve opening into a position which is located opposite the valve opening but is lifted from the valve seat; and
at least a second piston-cylinder unit by which the valve plate can be moved toward the valve seat and pressed against it from its position which is located opposite the valve opening;
wherein a piston rod constructed as a toothed rack is arranged at the piston of the second piston-cylinder unit and meshes with a pinion which is connected with an eccentric arrangement for swiveling the at least one valve rod and pressing the valve plate against the valve seat.

2. The vacuum valve according to claim 1, wherein the eccentric device is formed by pins connected with the pinion, these pins are arranged eccentrically relative to a central axis of the pinion or drum on which the pinion is arranged and project into recesses in the valve housing.

3. The vacuum valve according to claim 2, wherein the recesses are constructed as elongated holes.

4. The vacuum valve according to claim 3, wherein rollers are rotatably mounted on the pins.

5. A vacuum valve comprising:
a valve opening which is provided in a valve housing having an axis oriented in the through-flow direction of the valve and is surrounded by a valve seat;

a valve plate which is arranged at at least one valve rod and by which the valve opening can be closed in the closed state of the valve;

at least a first piston-cylinder unit by which the valve plate is displaceable from its open position releasing the valve opening into a position which is located opposite the valve opening but is lifted from the valve seat;

at least a second piston-cylinder unit by which the valve plate can be moved toward the valve seat and pressed against it from its position which is located opposite the valve opening but is lifted from the valve seat;

said first piston-cylinder unit having a closing cylinder space, wherein a force acting upon the valve plate in the direction of its position located opposite the valve opening is generated when the closing cylinder space is acted upon by pressure;

said second piston-cylinder unit having a closing cylinder space, wherein a force acting upon the valve plate in the direction of its position in which it is pressed against the valve seat is generated when the closing cylinder space is acted upon by pressure;

the closing cylinder space of the first piston-cylinder unit having a base, wherein the piston of the first piston-cylinder unit is located adjacent to this base in the position of the valve plate which completely releases the valve opening;

the closing cylinder space of the second piston-cylinder unit having a base, wherein the piston of the second piston-cylinder unit is located adjacent to this base in the position of the valve plate in which the latter is completely lifted from the valve seat;

a first connection line running between said base of the first piston-cylinder unit and said base of the second piston-cylinder unit, wherein a non-return valve is arranged in the first connection line and closes when there is a pressure in the closing cylinder space of the first piston-cylinder unit that is greater than or equal to the pressure in the closing cylinder space of the second piston-cylinder unit; and a mandrel being provided at the piston of the second piston-cylinder unit, which mandrel releases the non-return valve when the valve plate is in the position in which it is completely lifted from the valve seat.

6. The vacuum valve according to claim 5, wherein a recess is provided in the base of the second piston-cylinder unit, wherein a projection of the piston of the second piston-cylinder unit can be inserted into this recess in the position of the valve plate in which it is completely lifted from the valve seat, Wherein a first control line opens into this recess, in the area below the inserted projection at which a piston surface is provided.

7. The vacuum valve according to claim 6, wherein the mandrel is arranged at the projection.

8. The vacuum valve according to claim 6, wherein the recess in the base of the second piston-cylinder unit and the rest of the closing cylinder space of the second piston-cylinder unit are connected with one another via a non-return valve arrangement when the projection of the piston is inserted into the recess, wherein the non-return valve arrangement blocks when the pressure in the recess is greater than the pressure in the rest of the closing cylinder space.

9. The vacuum valve according to claim 8, wherein the non-return valve arrangement is formed by a line extending between the recess and the rest of the closing cylinder space of the second piston-cylinder unit, wherein a non-return valve is arranged in the line, and wherein a sealing ring is arranged at the outer surface of the recess to seal the projection inserted into the recess.

10. The vacuum valve according to claim 8, wherein the non-return valve arrangement is formed by a O-ring for end-position damping arranged in the recess and having a non-return valve function.

11. The vacuum valve according to claim 5, wherein the first piston-cylinder unit has an opening cylinder space, wherein a force acting upon the valve plate in the direction of its position which completely releases the valve opening is generated when this opening cylinder space is acted upon by pressure.

12. The vacuum valve according to claim 11, wherein the second piston-cylinder unit has an opening cylinder space, wherein a force acting upon the valve plate in the direction of its position in which it is lifted from the valve seat is generated when this opening cylinder space is acted upon by pressure.

13. The vacuum valve according to claim 12, wherein the opening cylinder space of the first piston-cylinder unit and the opening cylinder space of the second piston-cylinder unit are connected with one another by a second connection line into which a second control line opens.

14. The vacuum valve according to claim 5, wherein the first piston-cylinder unit and the second piston-cylinder unit are rigidly connected with one another and are swivelable jointly about a swiveling axis which extends vertical to the valve rod and vertical to the axis of the valve opening.

15. The vacuum valve according to claim 5, wherein the first piston-cylinder unit has a guide surface which supports the valve rod so as to be axially displaceable with a slight radial play.

* * * * *